US009794984B2

(12) United States Patent
Edge

(10) Patent No.: US 9,794,984 B2
(45) Date of Patent: Oct. 17, 2017

(54) TECHNIQUES FOR UTILIZING ACCESS POINT VICINITY INFORMATION

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/476,539

(22) Filed: Sep. 3, 2014

(65) Prior Publication Data
US 2015/0080019 A1    Mar. 19, 2015

Related U.S. Application Data

(60) Provisional application No. 61/879,092, filed on Sep. 17, 2013.

(51) Int. Cl.
H04W 24/00    (2009.01)
H04W 88/08    (2009.01)
(Continued)

(52) U.S. Cl.
CPC ........... *H04W 88/08* (2013.01); *G01S 5/0236* (2013.01); *G01S 5/0252* (2013.01); *H04W 4/02* (2013.01);
(Continued)

(58) Field of Classification Search
CPC ....... H04W 64/00; H04W 4/02; H04W 48/04; H04W 80/04; G11B 20/00007; H04L 29/08108; H04L 2012/5607
(Continued)

(56) References Cited

U.S. PATENT DOCUMENTS 5,491,769 A * 2/1996 Moller .................. G06T 3/4023
345/670
6,058,338 A    5/2000 Agashe et al.
(Continued)

FOREIGN PATENT DOCUMENTS

CN    103200678 A    7/2013
WO    2009142943    11/2009
(Continued)

OTHER PUBLICATIONS

International Search Report and Written Opinion—PCT/US2014/054112—ISA/EPO—dated Nov. 11, 2014.

*Primary Examiner* — Steve D Agosta
(74) *Attorney, Agent, or Firm* — Kilpatrick Townsend & Stockton, LLP

(57) ABSTRACT

Techniques for providing access point (AP) vicinity information are disclosed. In one example, the techniques include determining a first set of vicinity information corresponding to signal values for an AP at a set of grid points for the coverage area of the AP, encoding the first set of AP vicinity information based at least on a difference between AP vicinity information values for adjacent grid points to generate a second set of AP vicinity information, and providing the second set of AP vicinity information to a device. In one example, the techniques include receiving, for a set of grid points, a first set of AP vicinity information that is compressed based at least on a difference between AP vicinity information values for adjacent grid points, and performing decompression to obtain a second set of AP vicinity information corresponding to signal values for an AP at the set of grid points.

13 Claims, 10 Drawing Sheets

(51) Int. Cl.
  *H04W 4/02* (2009.01)
  *H04W 24/10* (2009.01)
  *G01S 5/02* (2010.01)
  *H04W 64/00* (2009.01)

(52) U.S. Cl.
  CPC ......... *H04W 24/10* (2013.01); *H04W 64/003* (2013.01)

(58) Field of Classification Search
  USPC ............... 455/456.1–457, 414.1; 710/68; 370/310.2, 328
  See application file for complete search history.

(56) References Cited

U.S. PATENT DOCUMENTS

| | | |
|---|---|---|
| 6,671,620 B1 | 12/2003 | Garin et al. |
| 7,400,974 B2 | 7/2008 | Fuchs et al. |
| 7,593,365 B1 | 9/2009 | Delker et al. |
| 8,032,151 B2 | 10/2011 | Paulson et al. |
| 8,190,730 B2 | 5/2012 | Dempsey |
| 8,644,853 B2 | 2/2014 | Moeglein et al. |
| 8,743,782 B1 | 6/2014 | Patel |
| 8,977,207 B2 | 3/2015 | Ledlie |
| 2002/0168985 A1 | 11/2002 | Zhao et al. |
| 2003/0050078 A1 | 3/2003 | Motegi et al. |
| 2004/0248586 A1 | 12/2004 | Patel et al. |
| 2004/0260622 A1 | 12/2004 | Chan et al. |
| 2005/0077995 A1 | 4/2005 | Paulsen et al. |
| 2005/0195781 A1 | 9/2005 | Ikeda |
| 2006/0200843 A1 | 9/2006 | Morgan et al. |
| 2006/0265507 A1 | 11/2006 | Banga et al. |
| 2007/0258407 A1 | 11/2007 | Li et al. |
| 2007/0275734 A1 | 11/2007 | Gaal et al. |
| 2007/0281707 A1 | 12/2007 | Thomson et al. |
| 2008/0284646 A1* | 11/2008 | Walley ............... G01S 5/14 342/357.29 |
| 2010/0095293 A1 | 4/2010 | O'Neill et al. |
| 2011/0057836 A1 | 3/2011 | Ische et al. |
| 2011/0059756 A1 | 3/2011 | Moeglein et al. |
| 2011/0269479 A1 | 11/2011 | Ledlie |
| 2011/0291885 A1 | 12/2011 | Marshall et al. |
| 2012/0231808 A1 | 9/2012 | Moeglein |
| 2013/0035109 A1 | 2/2013 | Tsruya et al. |
| 2013/0267218 A1 | 10/2013 | Do et al. |
| 2013/0281111 A1 | 10/2013 | Syrjarinne et al. |
| 2014/0019246 A1 | 1/2014 | Fraccaroli |
| 2015/0080020 A1 | 3/2015 | Edge |
| 2016/0323710 A1 | 11/2016 | Do et al. |

FOREIGN PATENT DOCUMENTS

| | | |
|---|---|---|
| WO | 2011032027 A1 | 3/2011 |
| WO | WO-2011067466 A1 | 6/2011 |
| WO | 2011149781 A2 | 12/2011 |
| WO | WO-2013136129 A1 | 9/2013 |
| WO | WO-2013149382 A1 | 10/2013 |
| WO | WO-2014070398 | 5/2014 |

\* cited by examiner

TECHNIQUES FOR UTILIZING ACCESS POINT VICINITY INFORMATION

CROSS-REFERENCE TO RELATED APPLICATIONS

This application claims the benefit of U.S. Provisional Application No. 61/879,092 entitled "Methods of Compressing and Aligning WiFi RF Heat Maps," filed Sep. 17, 2013, which is assigned to the assignee of the present application and hereby expressly incorporated by reference.

TECHNICAL FIELD

The present disclosure relates generally to determining a location of a mobile device, and in particular, to compressing radio frequency (RF) heat maps corresponding to an access point or base station.

BACKGROUND

Generally, a location of a mobile device (e.g., location fix) may be determined using measurements made by the device of radio signals transmitted by a number of access points, base stations and/or navigation satellites situated at known locations. Obtaining a location fix for a mobile device has become a critically important function in recent years. For mobile devices, there are numerous applications and web based services that take advantage of the location fix of the device. For example, a map application on a mobile device or on a remote web server can select appropriate maps, direction, driving routes, etc., based on the current location of the mobile device. A social networking application can identify other users within the vicinity based on the location of the device. In an emergency situation, public safety can be dispatched to the precise location of the user of a mobile device even when the user is not aware of the precise location. Many other examples exist.

Different techniques for obtaining a position fix, also known as a location estimate, a location or a location fix, for a mobile device may be appropriate under different conditions. In an outdoor environment, satellite-based approaches, e.g., GNSS (Global Navigation Satellite System) techniques may be suitable, because the mobile device may be able to receive satellite-based positioning signals with specific timing characteristics. Based on reception of such satellites signals, a position fix for the mobile device may be calculated. However, satellite-based approaches are not preferred in indoor environments, because these satellite signals cannot always be received or accurately measured indoors.

In indoor environments, such as a shopping mall, airport, sports arena, convention center, museum, hospital, office building, etc., terrestrial-based approaches making use of signals transmitted from cellular base stations (BSs) and/or wireless local area network (WLAN) access points (APs) are generally more useful for obtaining an accurate location fix for a mobile device. The mobile device observes and measures signals sent from BSs and/or APs at known locations. Different types of measurements may be obtained such as RSSI (Received Signal Strength Indication) and RTT (Round-trip Time). Such measurements may allow the mobile device or a separate location server to estimate the distance of the mobile device to each BS and/or AP. The mobile device or a location server may then estimate the location of the mobile device, based on the distances to different BSs and/or APs.

In another example, the mobile device may compare the measured signal strength from each BS or AP to a grid of signal strength data providing the expected (e.g., calculated or previously measured) signal strength from each BS or AP at different locations. The mobile device may then determine its location, using a process such as pattern matching, by finding a particular location for which the expected signal strengths for a number of BSs and/or APs most closely match the signal strengths measured by the mobile device. An advantage of this approach is that the locations of the BSs and/or APs may not need to be known—just the locations where signals from the BSs and/or APs can be received with different expected signal strengths.

One problem with BS and/or AP-based approaches, in which pattern matching is used and in which the mobile device computes its own location, is the amount of data that the mobile device may need to receive (e.g., from an external location server) about each AP or BS when expected BS or AP signal strength values are provided for a large number of different locations. For example, a WLAN AP based on IEEE 802.11 WiFi standards or a small BS (e.g., a Femto cell or Home Base Station) may typically provide coverage up to a distance of 100 meters from the AP or BS, and a location service provider may wish to enable location accuracy with an error about one meter. In such a case, expected signal strength values may be provided for a grid of location points spaced 1 meter apart from each other over the entire AP or BS coverage area. In this example, the number of separate location grid points may be around 40,000 (e.g., for a square grid of size 200 by 200 meters centered on the AP or BS). If the expected signal strength value for, and the location of, each grid point can be encoded using N octets of data, sending the signal strength data to a mobile device for the entire AP or BS coverage area would consume 40,000×N octets. Since a mobile device may be in coverage from other APs and/or small BSs, an equivalent amount of data may also need to be sent to the mobile device for each one of the other APs and/or small BSs. The total amount of data may easily be counted in mega-octets (e.g., even if N is as small as one octet) which may consume excessive resources in the mobile device, network and location server for signaling, processing and storage. In particular, this creates a problem for the mobile device, which generally has limited processing, battery power, and memory resources.

SUMMARY

As used herein, the term "access point" (AP) includes any wireless communication station and/or device, typically installed at a fixed terrestrial location and used to facilitate communication in a wireless communications system. For example, an access point may comprise a wireless local area network (WLAN) access point supporting the IEEE 802.11 standards or Bluetooth®, a cellular base station, Macro cell base station, Macro base station, Pico cell base station, Pico base station, Femto cell, Femto base station, eNode B, Node B, home NodeB, Home eNode B, small cell base station or the like.

In one example, a method for providing AP vicinity information is disclosed. The method includes, in part, determining a first set of vicinity information for a set of grid points for a coverage area of an AP, encoding the first set of AP vicinity information based at least on a difference between AP vicinity information values for adjacent grid points to generate a second set of AP vicinity information, and providing the second set of AP vicinity information to a mobile device. The first set of AP vicinity information may include mean received signal strength for the AP at a plurality of locations, mean round trip time for signal propagation between each grid point in the set of grid points and the AP, or other information.

In one aspect, the method may further include, in part, determining a plurality of delta values comprising differences between AP vicinity information values for adjacent grid points, and compressing at least some of the plurality of delta values to generate the second set of AP vicinity information.

In one aspect, the delta values are compressed based on two or more delta ranges. For example, the two or more delta ranges may include a low-range, a mid-range and a high-range.

In one aspect, the method may further include, in part, determining a plurality of double delta values comprising differences between the plurality of delta values for adjacent grid points. The second set of AP vicinity information may be generated by compressing at least some of the plurality of double delta values.

In one example, a method for utilizing access point vicinity information is disclosed. The method generally includes, in part, receiving, by a mobile device, a first set of AP vicinity information, wherein the first set of AP vicinity information is encoded and compressed based at least on a difference between AP vicinity information values for adjacent grid points for a coverage area of an AP, decompressing the first set of AP vicinity information to generate a second set of AP vicinity information, and determining location of the mobile device using information corresponding to a received signal and the second set of AP vicinity information.

In one aspect, the first set of AP vicinity information corresponds to a difference between received signal strength values at adjacent grid points. In another aspect, the first set of AP vicinity information corresponds to a difference between round trip time for signal propagation between the access point and each of the adjacent grid points.

In one example, an apparatus for providing access point vicinity information is disclosed. The apparatus includes, in part, means for determining a first set of vicinity information for a set of grid points for a coverage area of an AP, means for encoding the first set of AP vicinity information based at least on a difference between AP vicinity information values for adjacent grid points to generate a second set of AP vicinity information, and means for providing the second set of AP vicinity information to a mobile device.

In one example, a non-transitory processor-readable medium for providing access point vicinity information is disclosed. The processor-readable medium includes, in part, processor-readable instructions configured to cause a processor to determine a first set of vicinity information for a set of grid points for a coverage area of an AP, encode the first set of AP vicinity information based at least on a difference between AP vicinity information values for adjacent grid points to generate a second set of AP vicinity information, and provide the second set of AP vicinity information to a mobile device.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This invention provides a method for compressing and encoding vicinity information (e.g., RF signal strength values) for one or more access points (APs). The AP vicinity information may generally relate to any information that is indicative of a position for each of a plurality of locations (e.g., grid points) relative to the AP. For example, the vicinity information may include signal strength information (e.g., RSSI) at each location or grid point, timing values (e.g., RTT) at each location or grid point, or any other data that can be calculated and/or measured for a location or grid point. The AP vicinity information may be in the form of mean values, standard deviation values or other statistics.

As used herein, the terms "user equipment" (UE) or "mobile device" may be used interchangeably to refer to a device that may from time to time have a position location that changes. For example, a mobile device may comprise a cellular telephone, smartphone, tablet, wireless communication device, mobile station, laptop computer, a personal communication system (PCS) device, Secure User Plane Solution (SUPL) Enabled Terminal (SET), personal digital assistant (PDA), personal audio device (PAD), portable navigational device, and/or other portable communication devices.

In one embodiment, the AP vicinity information may be used in obtaining a location fix for a mobile device in an indoor environment. In this embodiment, the location fix may be a position derived from measurements made by the mobile device of signals transmitted by APs at known or unknown locations. Certain embodiments present a method for compressing the AP vicinity information for one or more APs residing in a neighborhood and providing the compressed information to a mobile device. The AP vicinity information may then be used by the mobile device to determine its location. While the vicinity information is described for WLAN or Wi-Fi APs, the same method of compressing the information and encoding the information may be used for other transmitters such as cellular BSs, small cells, small BSs, Bluetooth APs, home base stations, and the like.

Generally, AP vicinity information (also referred to as an RF heat map, or a heat map) is a graphical representation of data where the individual RF signal characteristics (e.g., mean RSSI, mean RTT) are contained in a matrix corresponding to a set of grid points. The AP vicinity information may be depicted with a set of colors (e.g., where the magnitude of a signal characteristic at any grid point determines a specific color around that grid point), or a set of numbers.

Figure 1:
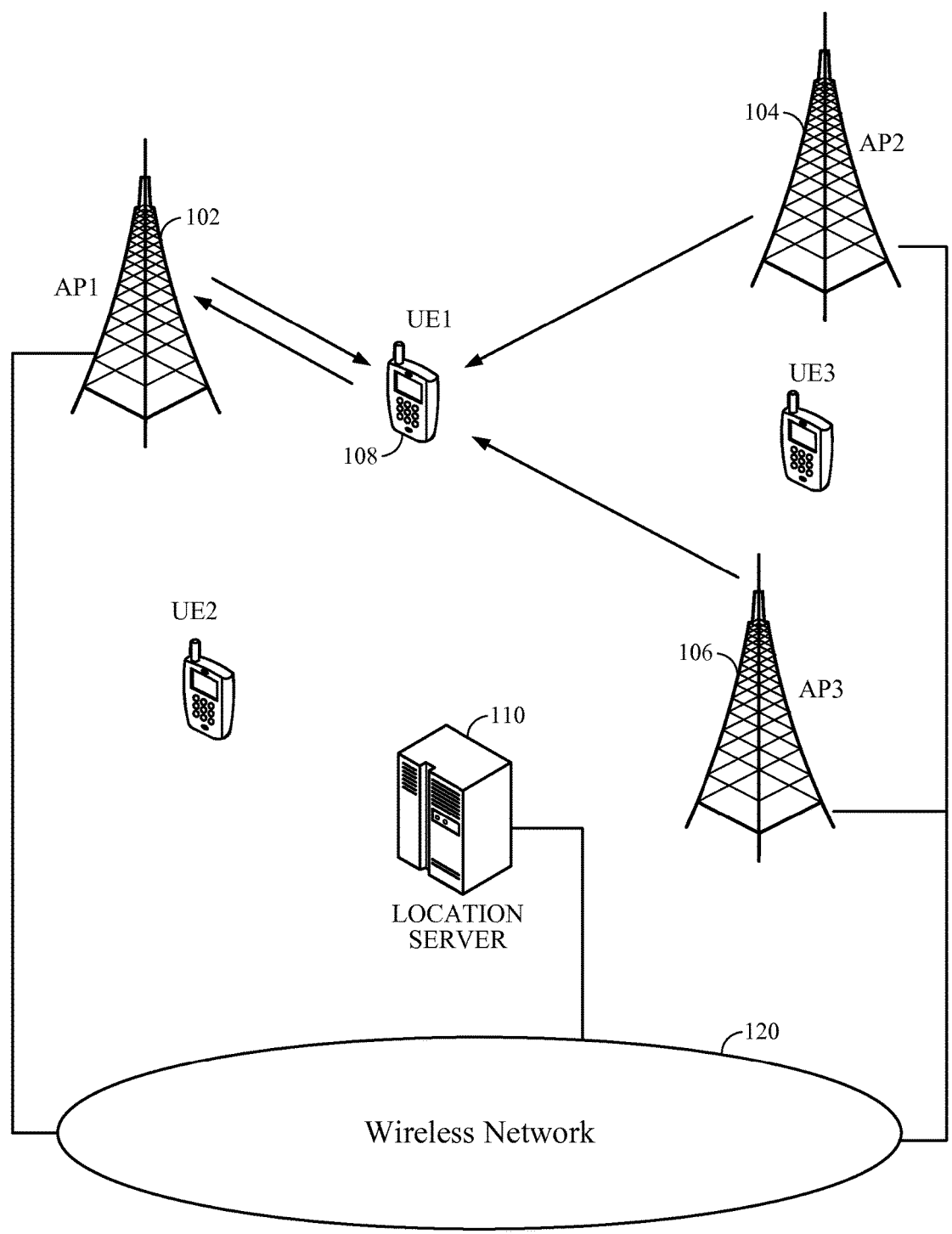
FIG. 1 illustrates a wireless communication network, in accordance with certain embodiments of the present disclosure.

FIG. 1 illustrates a wireless communication system 100, in accordance with certain embodiments of the present disclosure. As illustrated, the system 100 may include a plurality of access points (e.g., AP1 102, AP2 104, AP3 106) and user equipments (e.g., UE1 108, UE2, UE3). In addition, the system 100 may include a location server (LS) 110. In some embodiments, the APs 102, 104 and 106 and the LS 110 may be connected to or may be part of a wireless network 120 which may provide communications services to UEs (e.g., UE1, UE2 and UE3) such as transfer of voice and/or data between each UE and some other device. Wireless network 120 and its APs (e.g., APs 102, 104 and 106) may support wireless communication (e.g., to and from UE1, UE2 and UE3) using any standard or proprietary wireless technology such as Global System for Mobile Communications (GSM) defined by the Third Generation Partnership Project (3GPP), Wideband Code Division Multiple Access (WCDMA) defined by 3GPP, Long Term Evolution (LTE) defined by 3GPP, cdma2000 defined by the Third Generation Partnership Project 2 (3GPP2), IEEE 802.11 WiFi, Bluetooth, etc. UE1 may communicate with its serving access point (e.g., AP1 102) through a forward link 112 and a reverse link 114. UE1 may also receive signals from other access points (e.g., AP2 104 and/or AP3 106). It should be noted that although only a few UEs and APs, and only one LS are illustrated in FIG. 1, any number of each of these devices may be present in the system 100.

Location server 110 may store signal strength information, timing information and/or other signal related information corresponding to different APs (e.g., Wi-Fi heat maps) on a grid of points. The information stored by LS 110 may be calculated by LS 110 (or by some other entity and then provided to LS 110) based on known characteristics of APs (e.g., AP locations, transmission power, antenna characteristics, radio technology) and information about the coverage area of APs (e.g., local terrain, building floor plans, building materials). The information stored in LS 110 may also or alternatively be compiled from signal measurements of APs made by mobile devices (and/or by other APs) specifically assigned to measure signal characteristics of APs and to send the measurements to a server (e.g., location server 110) via crowdsourcing as a background task. The information stored in LS 110 may correspond to calculated and/or measured signal characteristics for each AP (e.g., mean RSSI, mean RTT) at each of a number of grid points distributed over the coverage are of the AP. For example, the grid points may correspond to a rectangular array oriented in a certain direction and containing rows and columns of grid points in which the distance between adjacent grid points along each row or column may be fixed and small (e.g., one meter). LS 110 may provide some or all of the stored information to the UEs (e.g., UE1, UE2 and UE3) and/or to other devices.

In order to precisely identify a set of grid points, first, a bounding box may be considered that covers a region of interest. Multiple grid points may be defined within the bounding box. Typically, the grid points are uniformly distributed within the region of interest. As an example, the grid points may reside at the corners of, or at the centers of, square-shaped cells. In general, the cells may have any other shape, such as a square, rectangle, hexagon, circle, ellipse, etc. without departing from teachings of the present disclosure.

Signals corresponding to an access point may be measured or computed (e.g., based on a local building layout and known RF propagation laws) for each of the grid points to generate a heat map. The heat map may be stored in a location server or any other devices in a wireless communication system. The heat maps may then be provided (e.g., by location server 110) to one or more mobile devices (e.g., UE1, UE2 and UE3) in the vicinity of the access point. As an example, the heat maps may be provided to a mobile device by a location server using the SUPL location solution defined by the Open Mobile Alliance (OMA). The heat maps may also be provided using the Long Term Evolution (LTE) Positioning Protocol (LPP) Extensions protocol defined by OMA which is known as LPPe. In addition, a mobile device (e.g., UE1, UE2 or UE3) may request a heat map from a location server (e.g., location server 110) using SUPL or LPPe and may provide its capabilities to the location server to support receipt of a heat map using SUPL or LPPe.

As an example, a Wi-Fi heat map may be generated for an access point. Considering that the Wi-Fi signal may have a range of close to 100 meters, if grid points are located at 1 meter apart, 40,000 grid points may be considered for each AP, as described in an earlier example. Even if a signal characteristic (e.g., mean RSSI or mean RTT) corresponding to each grid point takes only one octet, the amount of information that needs to be stored/communicated with each mobile device per signal characteristic and per AP may be equal to 40,000 octets. In addition, the mobile device may receive information corresponding to multiple APs in its vicinity and for several signal characteristics, which can easily amount to megabytes of information. Certain embodiments of the present disclosure describe methods for efficiently providing heat map information to a mobile device.

Figure 2:
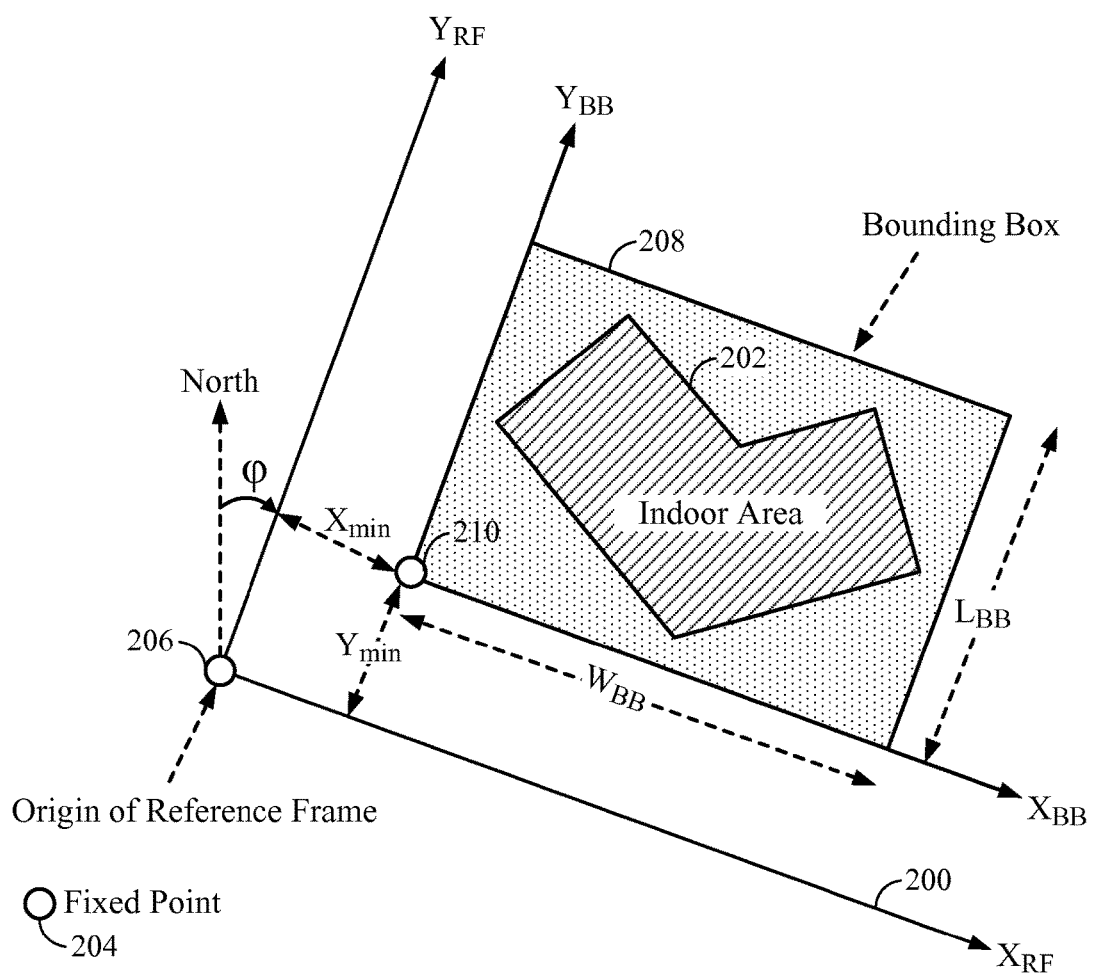
FIG. 2 illustrates an example bounding box that can be defined within or around a building, in accordance with certain embodiments of the present disclosure.

FIG. 2 illustrates an example reference frame 200 that can be defined to provide a local coordinate system and enable heat maps for some indoor (or outdoor) area 202 such a building, shopping mall, sports arena, and the like. The reference frame 200 may be used to define a set of grid points that may serve as the basis for determining heat maps for one or more access points. In FIG. 2, the location and orientation of the reference frame may be specified relative to a fixed point 204 whose location may be specified using absolute geographic coordinates (e.g., latitude, longitude and altitude) or by civic means (e.g., using a postal address and/or building designation such as "Main front entrance to shopping mall XYZ in city ABC" where XYZ and ABC are publicly known names). An origin 206 for the reference frame 200 may then be defined by relative displacements in directions North (or South), East (or West) and up (or down) from the fixed point 204. The reference frame may have horizontal and perpendicular X and Y coordinate axes, designated $X_{RF}$ and $Y_{RF}$, respectively, in FIG. 2, through the origin 206. Orientation of the reference frame is defined by a clockwise orientation angle $\phi$ between the direction of true North and the Y axis $Y_{RF}$. In one embodiment, a range of zero to 89 degrees may be used for $\phi$. In another embodiment, the range of $\phi$ may be zero to 359 degrees.

The reference frame 200 in FIG. 2 may be used to define a horizontal and rectangular bounding box 208 containing grid points associated with an RF heat map for an AP. The sides of the bounding box 208 may be parallel to the $X_{RF}$ and $Y_{RF}$ axes of the reference frame 200. In FIG. 2, $W_{BB}$ represents the width of the bounding box 208 (parallel to the $X_{RF}$ axis) and $L_{BB}$ represents the length of the bounding box 208 (parallel to the $Y_{RF}$ axis). Within the reference frame 200, a horizontal rectangular grid of points (described later in association with FIG. 3) may be defined where rows of grid points are parallel to the $X_{RF}$ axis and columns of grid points are parallel to the $Y_{RF}$ axis. The distance between adjacent grid points along each row and along each column may the same and fixed and may be used as the unit of length for other distances associated with the reference frame 200 such as the length $L_{BB}$ and the width $W_{BB}$ of the bounding box 208. One of the grid points may coincide with the origin 206 for the reference frame 200.

Position of the bounding box 208 may be defined relative to the reference grid 200 to include all or part of the coverage area of a particular AP and/or all or part of an area of interest such as indoor area 202. The bounding box 208 may have a local origin 210 which may be a corner of the bounding box with minimum X and Y coordinates, shown as $X_{min}$ and $Y_{min}$ in FIG. 2. The values of $X_{min}$ and $Y_{min}$ in units of the fixed inter grid point spacing may each be exact integers, meaning that there may be one grid point exactly at the local origin 210. Local X and Y coordinate axes, $X_{BB}$ and $Y_{BB}$, through the local origin 210 may then be defined that are parallel to the coordinate axes, $X_{RF}$ and $Y_{RF}$, respectively, for the reference frame 200.

Figure 3:
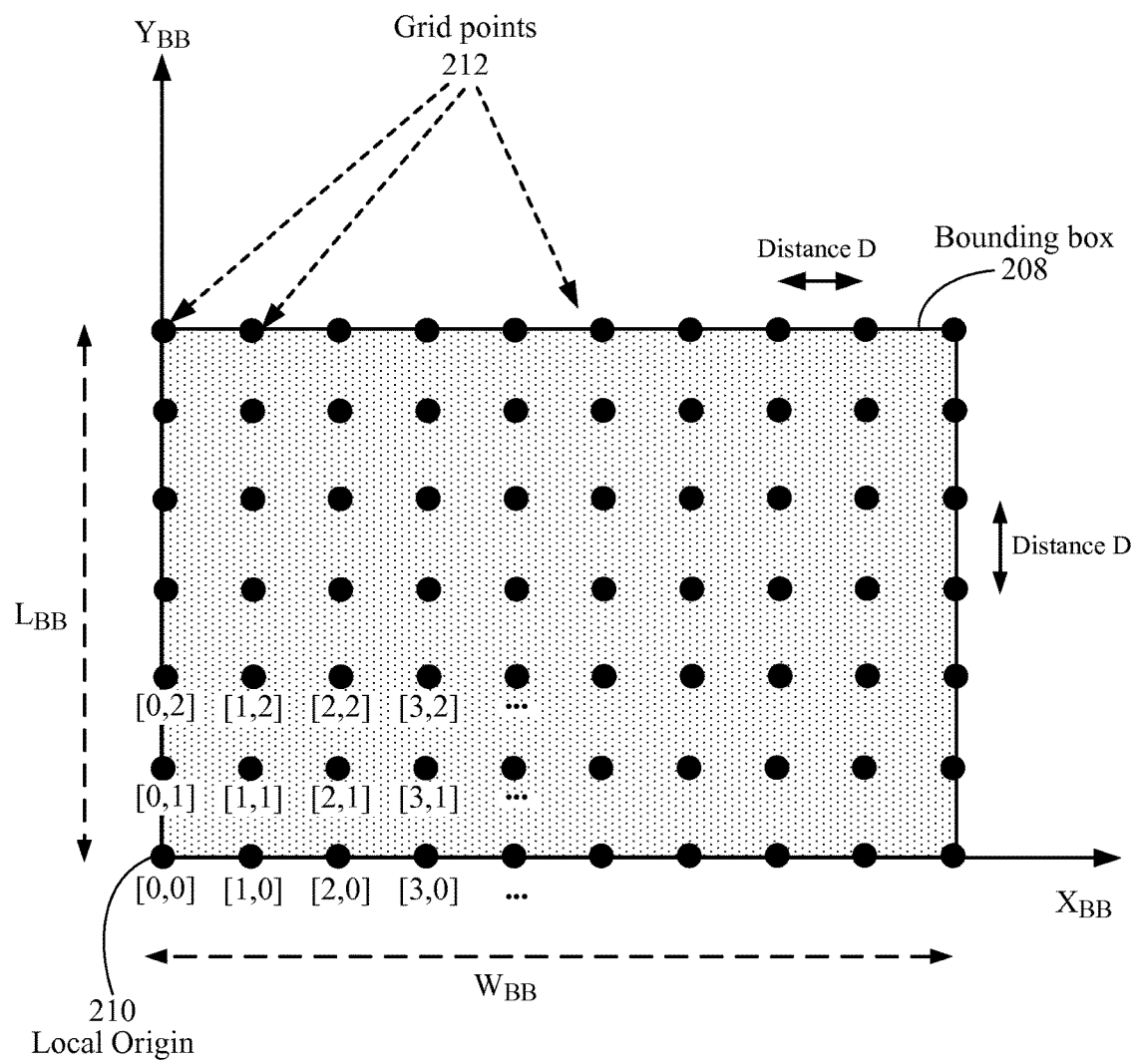
FIG. 3 illustrates an example set of grid points, in accordance with certain embodiments of the present disclosure.

FIG. 3 illustrates more details for the bounding box 208 in FIG. 2 and illustrates a set of grid points 212 that are within, or along the perimeters of the bounding box 208, in accordance with certain embodiments of the present disclosure. The set of grid points 212 may be defined relative to the reference frame 200 as described previously in association with FIG. 2. Thus, the grid points 212 may include one grid point at the local origin 210 of the bounding box 208 and additional grid points along rows and columns parallel to the local $X_{BB}$ and $Y_{BB}$ axes. The grid points 212 are separated by a fixed inter-grid point distance D. Since the length $L_{BB}$ and the width $W_{BB}$ of the bounding box 208 are each an integer multiple of the inter-grid point distance D, as described earlier for FIG. 2, the set of grid points 212 may include other grid points aligned with the other corners of the bounding box 208, as shown in FIG. 3, and grid points along and aligned with each of the four sides of bounding box 208, as further illustrated in FIG. 3. Grid points may each be assigned local coordinates [x,y] where x specifies the local X coordinate of the grid point along the local $X_{BB}$ axis in units of the distance D, and y specifies the local Y coordinate of the grid point along the local $Y_{BB}$ axis in units of the distance D. For example, the coordinates of the grid point at the local origin 210 will be [0,0] and with the coordinates of some other grid points nearby to the local origin 210 as also shown in FIG. 3. The inter-grid point distance D may be defined in units of decameters, meters, decimeters, or any other units. In certain embodiments, the distance between the grid points in X versus Y directions may be different, without departing from teachings of the present disclosure.

The set of grid points 212 in FIG. 3 may be used to provide signal characteristics (e.g., RSSI and/or RTT) for one or more APs (e.g., an AP or APs whose coverage area partly or completely overlaps with the bounding box 208). Values for each signal characteristic (e.g., mean RSSI, mean RTT) may be obtained by calculation and/or measurement for each of the grid points in the set of grid points 212. As described previously, if these values are provided (e.g., to a mobile device) without any compression or special encoding, the amount of data may be very large. Therefore, the values for each signal characteristic may be encoded and compressed.

Figure 4:
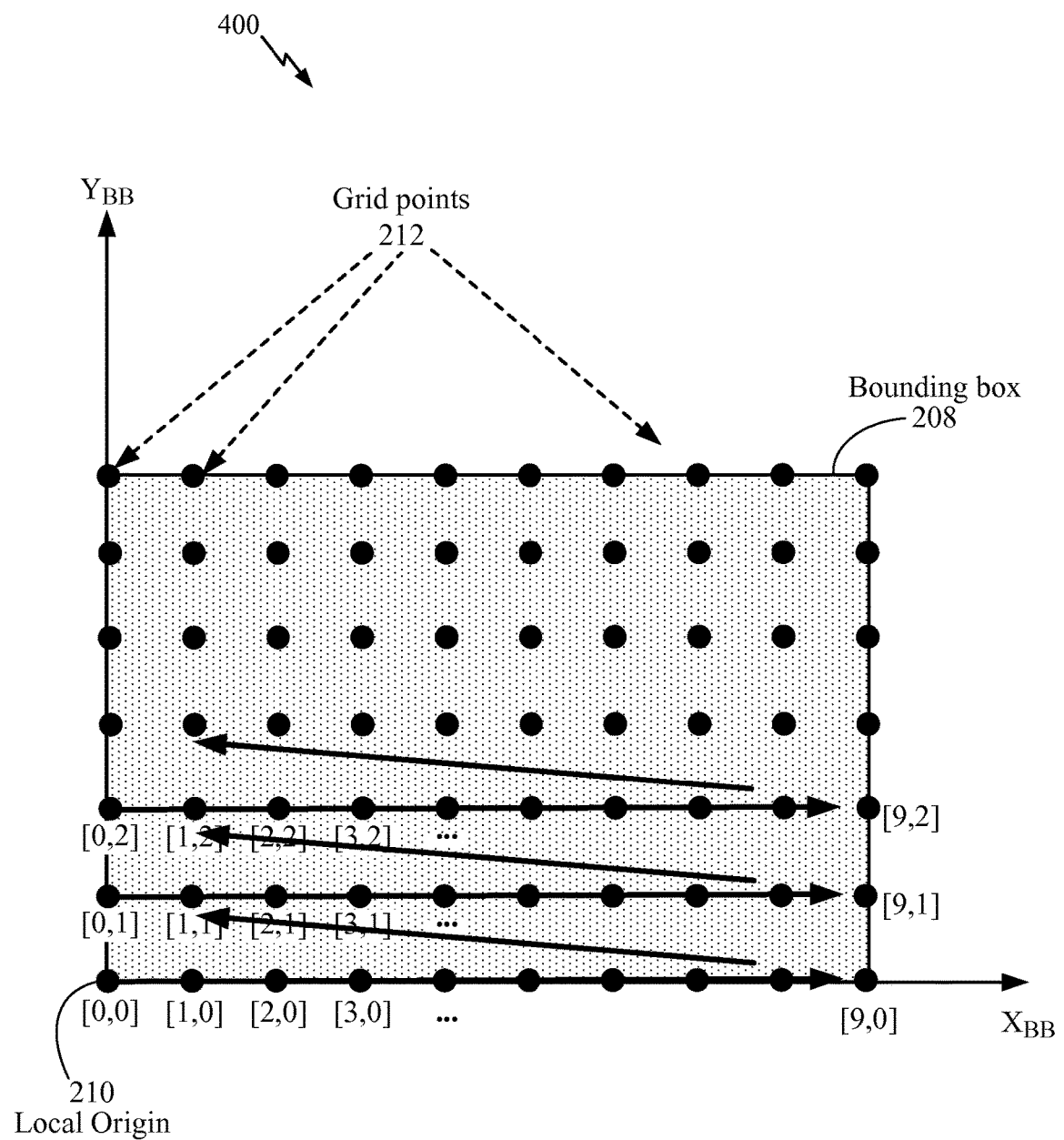
FIG. 4 illustrates an example scanning order for reading data corresponding to a set of grid points.
Figure 5:
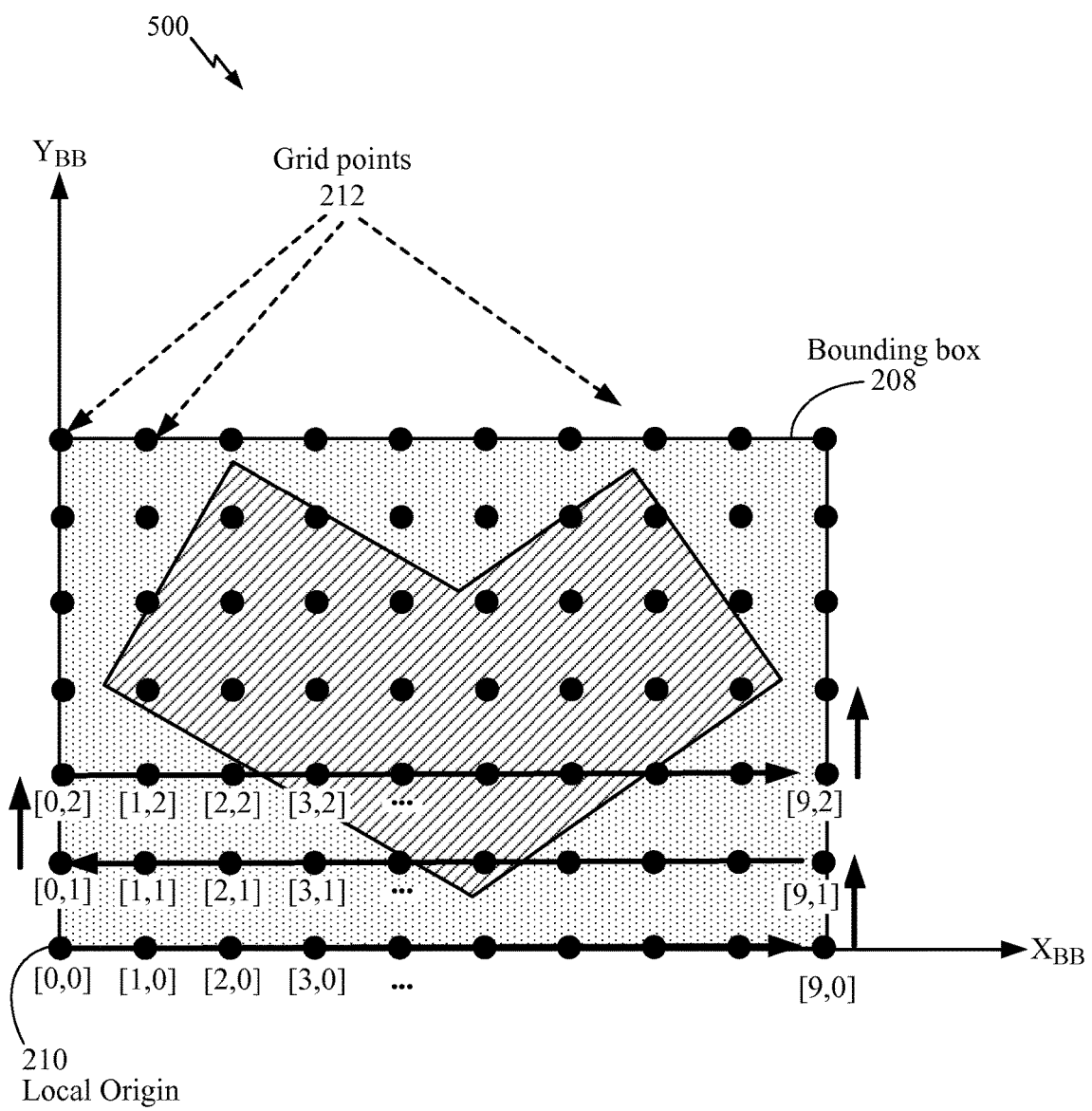
FIG. 5 illustrates another example scanning order for reading data corresponding to a set of grid points.

One of the parameters associated with such encoding and compression may be the order in which signal values are compressed and encoded as defined by the order in which their associated grid points in the set of grid points 212 are scanned. FIGS. 4 and 5 illustrate two example scanning orders that may be used to scan the set of grid points 212. The scanned information may then be encoded and stored in a device and/or communicated with other devices.

FIG. 4 illustrates an example scanning order 400 for encoding data in a heat map (e.g., to encode mean RSSI and/or RSSI standard deviation values) using the set of grid points 212 illustrated in FIG. 3. As illustrated, scanning may start from the local origin 210 of the bounding box 208 which has local X and Y coordinates [0,0] and may continue along the local $X_{BB}$ axis and thus along the first and bottom row from left to right in this illustration. In this example, information may be obtained and encoded for the sequence of grid points with local coordinates [0,0], [1,0], [2,0], [3,0] and so on until the end of the row with coordinates [9,0] in this example is reached. When all the points on the first row of the grid are scanned, the grid points in the second row which have a local Y coordinate of 1 may be scanned starting from the leftmost grid point (on the local $Y_{BB}$ axis). When the end of this row is reached, grid points along the next row with a local Y coordinate of 2 may be scanned starting with the grid point at the left on the local $Y_{BB}$ axis. In the example shown in FIG. 4, the grid points may thus be scanned with the following order: [0,0], [1,0], [2,0], [3,0], . . . , [9,0], [0,1], [1,1], [2,1], . . . , [9,1], [0,2], [1,2], [2,2], [3,2], etc. The last row to be scanned in this example would be the top row with a local Y coordinate of 6.

FIG. 5 illustrates another example scanning order 500 for encoding data for a heat map using the set of grid points 212 described in FIG. 3. Similar to the scanning order illustrated in FIG. 4, scanning may start from the local origin 210 of the bounding box 208 and continue along the local $X_{BB}$ axis (i.e., the first row) in the positive X direction along the direction shown by arrows (bottom row, from left to right in this example). As illustrated, the first row may be scanned from left to right to obtain and encode information corresponding to grid points [0,0], [1,0], [2,0], [3,0], . . . , [9,0]. When all the points on the first row of the grid are scanned, the grid points in the second row (which have a local Y coordinate of 1) may be scanned from the closest grid point to the last scanned point in the first row (e.g., the rightmost point in the second row which has an X coordinate of 9). Scanning may continue from right to left in the second row. Once the complete row is scanned, scanning may resume in the next row (with a local Y coordinate of 2) starting from the closest grid point and proceeding from left to right in this example. In the example shown in FIG. 5, the grid points may thus be scanned as follows: [0,0], [1,0], [2,0], [3,0], . . . , [9,0], [9,1], [8,1], [7,1], . . . , [0,1], [0,2], [1,2], etc.

In one embodiment, the scanning order shown in FIG. 4 or in FIG. 5 may be used in compression techniques as described herein (e.g., Delta based RSSI/Std-Dev). This scanning order allows deltas (e.g., as described later herein) to continue from one row to the next. In one embodiment, conversion between different compression techniques (e.g., to/from uncompressed RSSI encoding) may be possible on a row by row basis. In this case, compressed values according to a first compression method and corresponding to one row of grid points are converted to compressed values according to a second compression method. Conversion may be done by decompressing the values corresponding to the first method for the entire row and then compressing the resulting uncompressed values using the second method. Conversion between different compression techniques on a row by row basis may avoid the need to decompress values for all grid points (e.g., for all rows) according to a first method before compressing the resulting uncompressed values according to a second method. This may avoid the need for extensive storage to store the uncompressed values for all grid points during the conversion process.

Delta Encoding of Signal Values

One embodiment efficiently compresses signal values corresponding to different grid points—e.g., mean RSSI or mean RTT values as calculated and/or measured for each grid point in a set of grid points 212 for some bounding box 208. This method makes use of high correlation between signal values (e.g., mean RSSI, RSSI standard deviation) for adjacent grid points, and a fixed or slowly varying signal value gradient along any bounding box row or column. It should be noted that although this compression method is described for RSSI values below, it can be used to compress data associated with any other type of signal that corresponds to a plurality of points (e.g., RTT, signal to noise ratio, and the like). The method may be employed by a location server (e.g., location server 110 in FIG. 1) or by another entity (e.g., an entity that provides a compressed heat map to a location server or to a mobile device).

In one embodiment, RSSI values may be determined (e.g., by a location server such as location server 110) for each grid point in a set of grid points 212 within or along the perimeter of a bounding box 208 by either calculation and/or measurement. As an example, the RSSI values may be calculated based on a plurality of predetermined parameters, such as AP transmission power and antenna gain, AP location, building or other indoor structural layout, RF propagation physical laws, and the like. In another example, RSSI values may be measured by one or more mobile devices at different locations. The mobile devices may send the measured values to the location server for storage and/or further analysis. As an example, the location server may generate heat map information corresponding to a set of grid points 212 based on the measurements.

In one embodiment, the RSSI values may be encoded without compression for each grid point—e.g., using a single octet for each value expressing a value between 0 and 255, where the RSSI value V1 in units of decibel milliwatts (dBm) may be given by the encoded value V2 by some known relationship such as:

$$V1=(127-V2) \text{ dBm} \qquad \text{Eqn (1)}$$

Next, the uncompressed values (e.g., the encoded values V2 for equation (1)) may be scanned by scanning the associated grid points using a defined scanning order (e.g., as illustrated in FIG. 4 or FIG. 5). As each grid point is scanned, the uncompressed RSSI value (e.g., in the range 0 to 255 and encoded using 8 bits) corresponding to the grid point currently being scanned may be compressed to be stored in a smaller number of bits. The compressed bits may be added to one or more strings of bits representing the entire compressed heat map associated with the set of grid points 212 for the bounding box 208 and the particular AP.

In one embodiment, a delta compression method may start by entering in a heat map bit string the 8 bit RSSI value for the first grid point. The first grid point may be selected based on parameters of the heat map and the scanning order. Without loss of generality, the origin 210 of the bounding box 208 may be considered as the first grid point. For succeeding grid points, each of the 8-bit RSSI values may be compressed to a smaller delta value by entering one of the following compressed RSSI values into the compressed heat map bit string.

0: a single "0" bit is entered into the heat map bit string if the previous compressed binary value in the heat map would otherwise be repeated. For example, if the previous compressed binary value is C and the next compressed binary value to be entered into the compressed heat map bit string is also C, then instead of entering C again, a binary value of "0" is entered. This allows efficient one-bit encoding for repeated delta values.

1xxx (with xxx in the range 000 to 110): a 4-bit delta value starting with a leading "1" bit is entered into the compressed heat map bit string to encode a delta value defined as:

$$\text{delta=RSSI for current grid point-RSSI for previous grid point} \qquad \text{Eqn (2)}$$

The delta obtained from equation (2) is mapped to a 3 bit value for xxx (above) if it is within a certain range. In one embodiment, the range may be −6 to +6 (e.g., in units of dBm) and the mapping can use one of three different delta ranges as follows:

Low-range: −6, −5, −4, −3, −2, −1, 0;
Mid-range: −3, −2, −1, 0, +1, +2, +3 (This may also be the initial range);
High-range: 0, +1, +2, +3, +4, +5, +6

Each range contains 7 delta values and defines a mapping (not shown above) from each of the 7 delta values to a different bit string xxx in the range 000 to 110. For example, the mapping for the mid-range might be −3→000, −2→001, −1→010, 0→011, 1→100, 2→101, 3→110. If the delta in equation (2) lies within one or more of the above ranges, it can be mapped to a 3 bit binary value xxx by selecting the range or one of the ranges that it lies within. The mapped binary value xxx combined with a leading 1 (i.e. the 1xxx binary value) is then entered into the compressed heat map bit string. As described earlier, if this will cause a repetition of the previous value, a binary value of "0" would be entered instead. To select and indicate the range used for the mapping, the mid-range may be used as an initial range, allowing delta values in the range of −3 to +3 to be encoded. However, if a delta value outside of the mid-range needs to be encoded, the range may be switched to the low-range or to the high range using one of the escape codes, as described below. This escape code may be entered into the compressed heat map bit string followed by the encoded 1xxx value for the delta. The new range (low or high range) may then be used to encode further delta values until a delta value is encountered that is outside this new range when the range may again be explicitly switched using an escape sequence as described below. In one embodiment, switching the delta range requires insertion of 6 bits (as described below). Therefore, a range may only be switched when succeeding delta values are also likely (or known to be) in the same range. If the delta in equation (2) is outside each of the three ranges, or outside the current range with the range not being switched, then the RSSI cannot be encoded as a delta and may be encoded using more bits, as described below.

1111: A 4-bit escape code of all 'ones' is used to encode other values or actions depending on the next one or two bits after the 1111, as follows:

11110: A 1111 followed by a "0" indicates that an uncompressed 8-bit RSSI value will be inserted into the next 8 bits for the compressed heat map bit string. This is used when a delta cannot be (or is not) encoded in 4 bits.

111110: A 1111 followed by a 10 may be entered in the compressed heat map bit string to indicate a change to the current delta range to the lower of the current two unused delta ranges.

111111: A 1111 followed by a 11 may be entered in the compressed heat map bit string to indicate a change to the current delta range to the higher of the current two unused delta ranges.

It should be noted that the encoding described above is just one example. Other types of delta based encoding may be used employing other ranges for the deltas in equation (2), different numbers of bits to encode the deltas, other means to encode repeated values and other types of escape codes, and the like.

Figure 6:
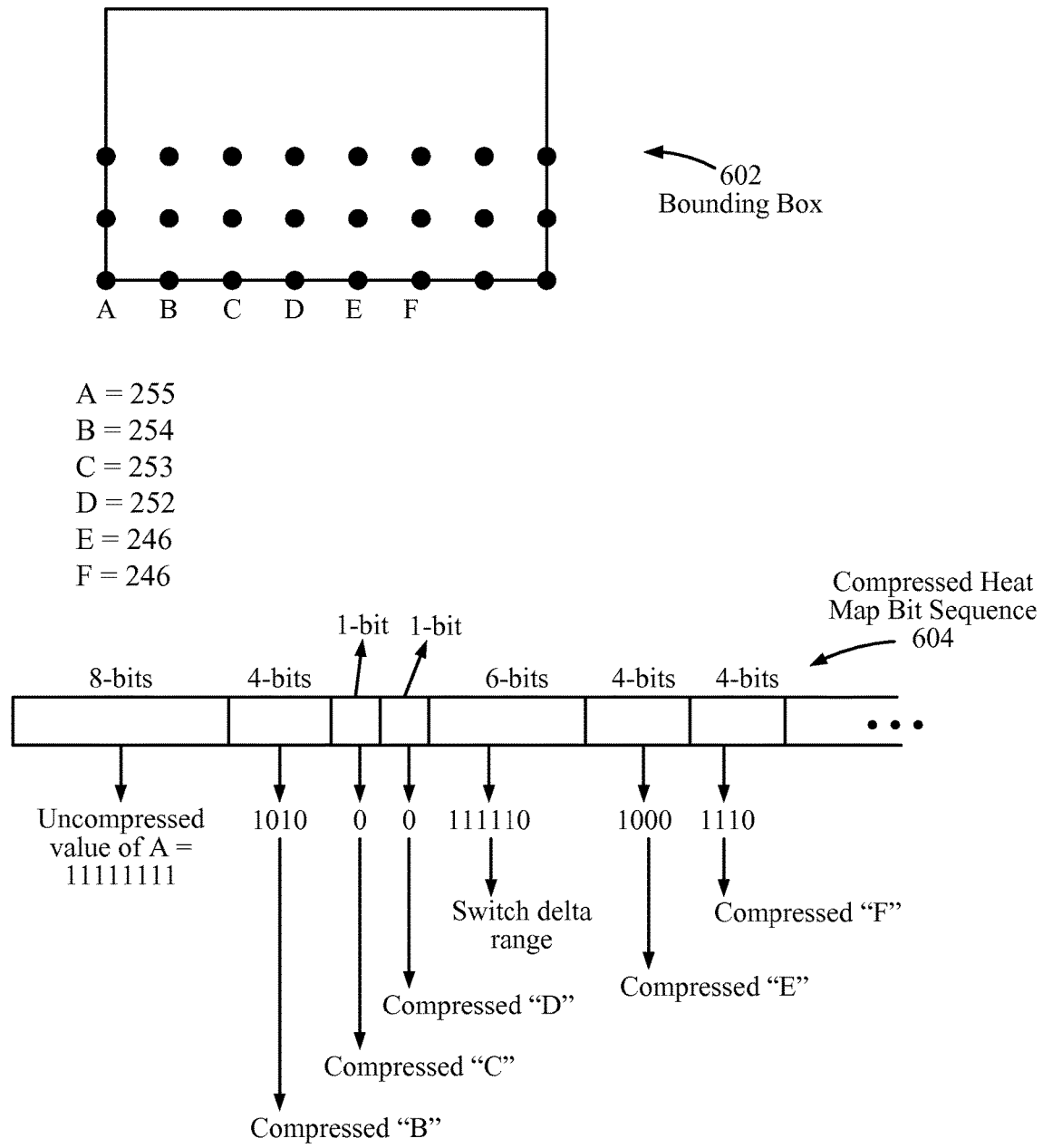
FIG. 6 illustrates an example heat map and an example compressed delta sequence, in accordance with certain aspects of the present disclosure.

FIG. 6 illustrates an example bounding box 602 containing a set of grid points with associated RSSI values in which RSSI values are compressed to generate a compressed heat map bit sequence 604, in accordance with certain aspects of the present disclosure. In this example, the RSSI values corresponding to six consecutive grid points A, B, C, D, E and F in the scan order have the values A=255, B=254, C=253, D=252, E=246 and F=246, respectively. Using the delta compression method, as described above, the first point (e.g., A) may be represented by 8 bits (e.g., an uncompressed value of 255) since A is the first grid point in the heat map. Next, the point B is represented by calculating the difference B−A=254−255=−1. This value can be represented with four bits (e.g., 1010) since it is within the mid-range which may be the initial range used to generate the compressed heat map.

The next value corresponding to the grid point C provides a delta value given by 253−254=−1, which is a repetition of the previous delta value. Hence, it can be represented in the compressed heat map bit sequence with only one bit (e.g., 0). Similarly, the grid point corresponding to point D provides a delta value of −1 which can be encoded using one bit (e.g., 0) as a repetition of the previous value.

The next value corresponding to the point E yields a delta value of 246−252=−6. This delta value cannot be encoded using the mid-range (since this only encodes delta values between −3 and +3) but can be encoded using the lower range which encodes values between −6 and 0. Hence the mid-range may be switched to the lower range by entering the 6 bit binary value 111110 and then a 4 bit encoding for the delta value −6 may be entered using the lower range (e.g., by entering a binary value of 1000 as shown in FIG. 6).

The next value corresponding to the point F has a delta value of 0 which may also be encoded as a 4 bit value using the lower range—e.g., by entering a binary value of 1110 as shown in FIG. 6. The process may continue until values corresponding to all of the grid points are compressed. As a result, instead of using 8 bits to represent values for each of the grid points A, B, C, D, E and F (e.g., 6×8=48 bits), in one embodiment, 8, 4, 1, 1, 6, 4 and 4 bits are used to represent RSSI values corresponding to the grid points A, B, C, D, E and F. Therefore, the total number of bits that are used to represent values corresponding to the grid points A, B, C, D, E and F is equal to 8+4+1+1+6+4+4=28. It should be noted that as the number of points grow, the delta encoding shows more savings in terms of number of bits that are used to represent the information in the heat map.

In one embodiment, even with RSSI values expressed in units of 0.5 dBm, suitable grid point spacing (e.g., reducing or increasing the inter-grid point distance D in FIG. 3) could enable most RSSI values to be encoded as 4-bit delta values by toggling between the three delta ranges (e.g., low-range, mid-range and high-range). In addition, delta values for nearby pairs of adjacent points may be correlated in the case of some APs enabling use of one bit in the case of repetition of the same delta over long spans of grid points. As a result, with the delta encoding, a compression of at least 2:1 could be achievable if most RSSI values are encoded as 4-bit deltas. In addition, if at least 50% of RSSI deltas are repetitions, compression can be over 3:1.

Double Delta Encoding of RSSI Values and Standard Deviation

Certain embodiments take advantage of expected high correlation between RSSI delta values, as described above. In this method, which is referred to as 'double delta' encoding herein, delta values (also referred to as "single delta values") are first obtained for each grid point along each row of a bounding box except for the first grid point in each row where a column-based delta is obtained. Next, deltas between deltas (e.g., double deltas) are obtained for each grid point column-wise between adjacent rows except for the first column. The result is a set of double delta and some single delta values with one value associated with each grid point. The method of obtaining double values may be employed by a location server (e.g., location server 110 in FIG. 1) or by another entity—e.g., an entity that provides a compressed heat map based on double delta values to a location server or to a mobile device.

Figure 7:
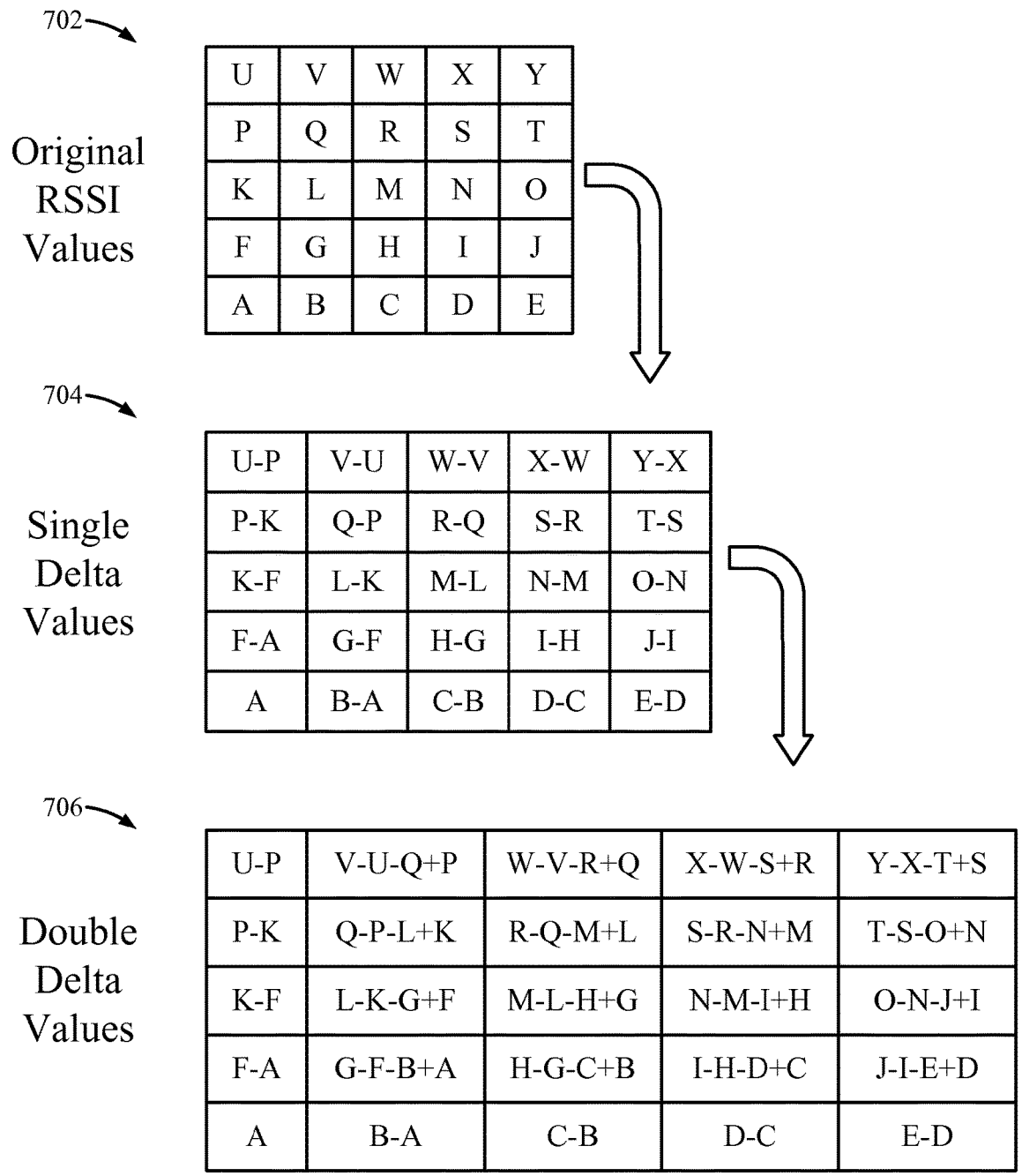
FIG. 7 illustrates three example tables showing the steps performed in delta and/or double delta compression methods, in accordance with certain embodiments of the present disclosure.

FIG. 7 illustrates three example tables showing the steps performed in obtaining the single delta and double delta values for an example bounding box containing 25 grid points arranged in 5 rows and 5 columns, in accordance with certain aspects of the present disclosure. Table 702 illustrates original uncompressed RSSI values at the different grid points in the example bounding box. For ease of reference, these values are shown using alphabetic letters A through Y. If the scanning order as illustrated in FIG. 4 is used, the values in the table 702 may be scanned in the order A, B, C, D, E, F, G, . . . , Y.

Table 704 illustrates example single delta values (e.g., difference values) between adjacent grid points as obtained from the values in table 702. As illustrated, the first value in the heat map at the local origin (e.g., A) is directly mapped to the delta table shown in table 704 without change. Delta values for other grid points in the first row (e.g., the bottom row) of the table 704 are calculated by determining a difference between adjacent values in table 702. As an example, the values in the first row of the delta table are A, B−A, C−B, D−C and E−D. Similarly, delta values for grid points in the second row of the table 704 may be determined from differences between adjacent values in table 702 as F−A, G−F, H−G, I−H and J−I.

In this example, the delta value for the first grid point in the second row (e.g., F−A) is generated by determining the difference between the value for the first grid point of the second row in the original table (e.g., F, as illustrated in table 702), and the value of the first grid point of the first row in the original table (e.g., A). This first delta value for the second row in table 704 is a column-based delta as the two values (A and F) from which it is obtained are in the same column in table 702. Delta values for other grid points in the second row in table 704 are row-based since they are each obtained from adjacent values in table 702 from the same row. This pattern is repeated to obtain the delta values for the other rows (rows 3, 4 and 5) in table 704.

Table 706 illustrates example double data values as obtained from differences between the single delta values for adjacent grid points in table 704 according to the teachings herein. Note that the values in table 706 mainly comprise double delta values, but include (single) delta values for the grid points in the first column and the first row, and one original value at the first grid point, at the origin. The single delta and double delta values in table 706 may be compressed by scanning the complete set of grid points using (e.g., 25 grid points in the example in table 706) using the scan order shown in FIG. 4 or in FIG. 5 and encoding the single delta or double delta value for each scanned grid point (or the original value for the grid point at the origin) to generate a compressed heat map bit string.

As an example of encoding, in one embodiment, the scanning order as shown in FIG. 5 may be used to scan the set of grid points and encode the single or double delta values for each of the scanned grid points. Initially, the RSSI value for the grid point at the origin (e.g., value A in table 706) may be inserted into the compressed heat map string using an 8 bit value—e.g., encoded according to equation (1). The encoding of a single delta or double delta value scanned at each succeeding grid point in the scan order (e.g., the value B−A for the second grid point scanned in table 706) may proceed using the steps below.

0: Enter a single "0" bit in the compressed heat map bit string if a single delta or double delta value for the current grid point is the same as the single delta or double delta value for the previous grid point in the scanning order.

1xxx: Enter a 4-bit value with a leading "1" bit to encode a single delta or double delta value using the 4-bit encoding method defined above with its three delta ranges if the single delta or double delta to be encoded is included in at least one of the three delta ranges.

1111: Enter a 4-bit escape code of "1111" followed by two additional bits (either "10" or "11") to change the delta range when needed, as described previously. Enter a 4-bit escape code of "1111" followed by a "0" bit and an encoding for a single delta or double delta value when the single delta or double delta value falls outside the three delta ranges used to encode single or double delta values using four bits. In this case, the encoding of the single delta or double delta value that is inserted into the compressed heat map bit string may use 10 bits to encode single delta or double delta values in the range −510 to +510 assuming the original RSSI values (e.g., values A-Y in table 702) are in the range −128 to +127. In this embodiment, encoding of a single delta or double delta value using 10 bits may be used rather than encoding of the uncompressed RSSI value using 8 bits in order to allow a receiver to retrieve all of the original RSSI values from the encoded delta and/or double delta values.

It should be appreciated that the above description in association with FIGS. 4 through 7 can be used for encoding of AP vicinity information including values for mean RSSI, RSS standard deviation, mean RTT, RTT standard deviation, or any other signal values or parameters. The encoded values (e.g., means RSSI values or mean RTT values) may be sent by a server (e.g., location server 110 in FIG. 1) to a mobile device (e.g., UE1 108 in FIG. 1) in the form of a compressed heat map bit string obtained as described above. In addition, the server may provide other parameters to the mobile device such as the identity of the AP to which the heat map applies (e.g., a WiFi MAC address in the case of a WiFi AP or a cell ID in the case of an AP that is a home base station or femto cell). Other parameters provided by the server to the mobile device may include a description of the bounding box and the set of grid points for the heat map—e.g., may include the location of the local origin 210 for the bounding box 208 relative to the fixed point 204, the absolute location of the fixed point 204, the orientation angle ϕ of the bounding box 208, the length $L_{BB}$ and width $W_{BB}$ of the bounding box 208 and the inter-grid point distance D. Compared to the size of compressed heat map bit string, these additional parameters may be small in size and consume little storage in the server and mobile device.

In one embodiment, a mobile device such as UE1 108 in FIG. 1 that receives encoded and compressed AP vicinity information performs a reverse process in which encoded and compressed values (e.g., contained in a compressed heat map bit string constructed at a server for a particular signal characteristic of an AP at different grid points in a certain bounding box) are decompressed and returned to their original uncompressed (e.g., 8 bit) state. The reverse process should be evident to anyone versed in the art from the above description since the various steps described above are all reversible.

Referring back to the example in FIG. 6, if a mobile device (e.g., UE1 108 in FIG. 1) receives the compressed heat map bit string 604, which includes 28 bits corresponding to the RSSI values of the grid points A, B, C, D, E and F in FIG. 6, the mobile device may decompress the values using a reverse procedure. For example, the mobile device may start the decompression process by looking at the eight bits at the beginning of the compressed heat map bit string 604. The first eight bits are by convention the uncompressed RSSI value for the first grid point in the scanning order—i.e. for grid point A. Since the first eight bits contain the binary value "11111111", the device decodes the RSSI for the first grid point A as 255.

The mobile device may employ equation (1) (or some other equation) to obtain a value for the RSSI in dBm—e.g., if equation (1) is used, the RSSI value in dBm would be −128 dBm. The next four bits have the value "1010" and thus encode a delta value (e.g., since they are not the escape sequence "1111"). Since the mid-range is used to encode delta values initially, the device maps the mid-range value "010" to a delta value using a known mapping for the mid-range which in this example yields a delta value of −1. Hence, the receiver adds the delta value of −1 to the previous RSSI value of 255 to obtain an RSSI value of 254 for the next grid point B.

The next bit has the value "0" which indicates that the previous value in the compressed heat map bit string is repeated. This value was "1010" which encodes a delta value of −1. Hence, the mobile device may obtain the next RSSI value as the previous RSSI value (254) plus the delta value of −1 giving an RSSI value for the third grid point C as 253. The next bit in the compressed heat map bit string is also a "0" so the previous process may be repeated by the device to give an RSSI value for the fourth grid point D as 252. The next four bits have the value "1111" which signifies an escape code. As the next 2 bits are "10", the device recognizes a change of the delta range from the mid-range initially used to the lower delta range.

The next four bits are "1000" which the mobile device may recognize as encoding a delta value. As the lower delta range is now used, the mobile device may map the value "000" using the lower delta range to a delta value of −6. The delta value of −6 may be added to the previous RSSI value of 252 to give an RSSI value for the fifth grid point E of 246. The next four bits "1110" encode another delta value and may be mapped by the mobile device to a delta value of 0 using the lower delta range. The delta value of 0 may then be added to the previous RSSI value of 246 to give an RSSI value of 246 for the sixth grid point F. The decoding and decompression process may be continued by the mobile device to obtain RSSI values for other grid points within the bounding box 602 in this example. The mobile device may thereby restore the original RSSI values for the set of grid points in the bounding box 602.

For certain embodiments, if each AP has a unique heat map (e.g., a heat map containing mean RSS values or a heat map containing mean RTT values), the heat map can be referenced or identified in part using the media access control (MAC) address of the AP. In addition, a version number may be used to allow any heat map to evolve over time. Each time that a heat map for a particular AP is updated (e.g., based on new crowdsourcing measurements), the version number for the heat map may be changed (e.g., may be incremented by one modulo some limiting value such as 256). For example, a UE can indicate to a location server the current version of any heat map it has for a particular AP. The location server can then provide a new heat map to the UE if a new heat map exists with a different version, and if the new heat map is significantly different from the version of the heat map which the UE has.

In one embodiment, uncompressed RSSI and RTT heat maps may be used in the network. In one embodiment, JPEG compression may be used (e.g., instead of delta or double delta compression) to compress the data in a heat map.

Figure 8:
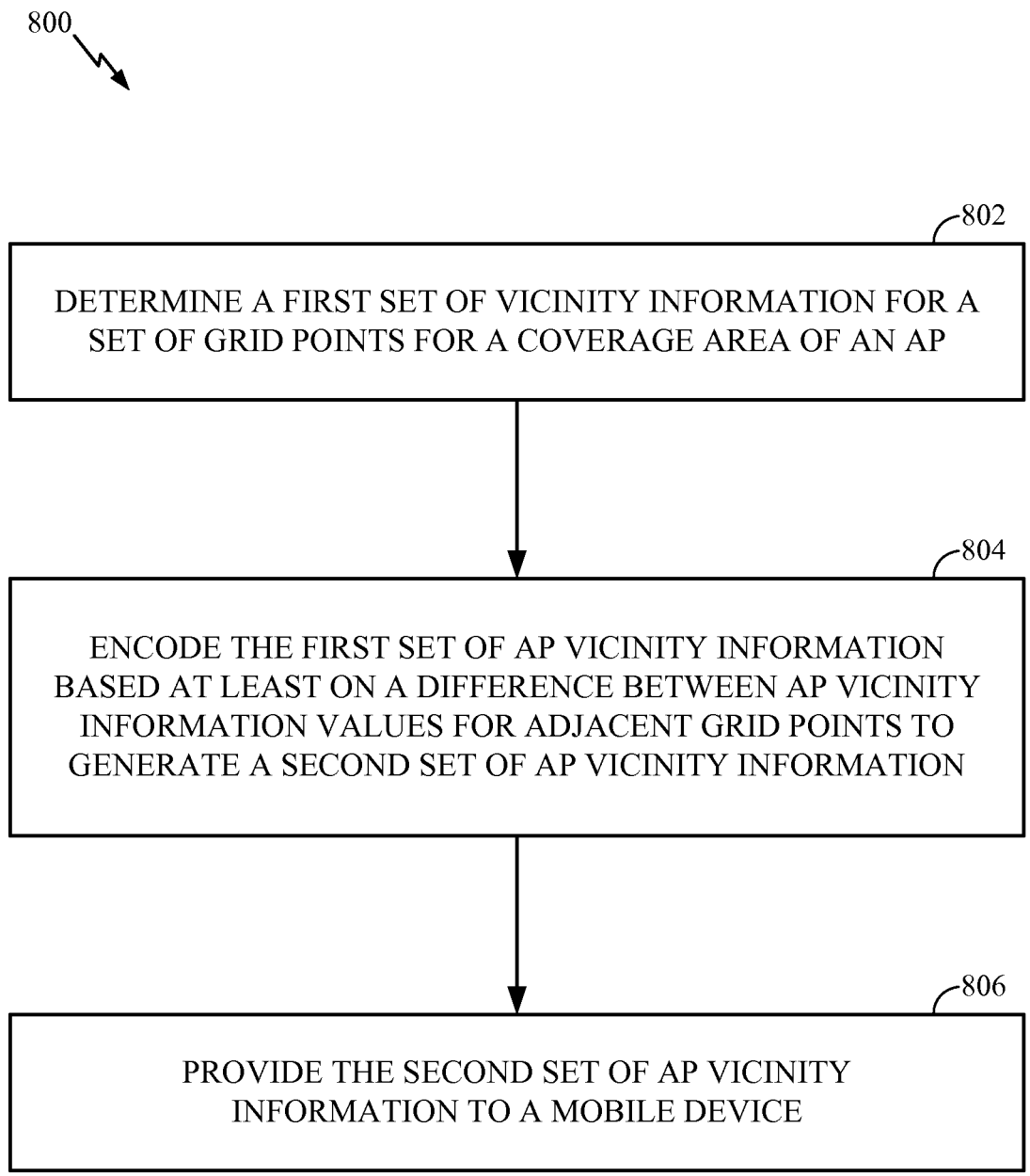
FIG. 8 illustrates example operations that may be performed by a device to efficiently provide vicinity information, in accordance with certain embodiments of the present disclosure.

FIG. 8 illustrates example operations of a process 800 that may be performed by a device such as location server (e.g., location server 110 in FIG. 1) to provide access point vicinity information, in accordance with certain embodiments of the present disclosure. At 802, the device may determine a first set of vicinity information for a set of grid points for the coverage area of the AP. At 804, the device encodes the first set of AP vicinity information based at least on a difference between AP vicinity information values for adjacent grid points to generate a second set of AP vicinity information. At 806, the device provides the second set of AP vicinity information to a mobile device. In one embodiment, the mobile device may use the AP vicinity information to determine or help determine its location.

For certain embodiments, a location server may encode the AP vicinity information and send it to a mobile device. The mobile device may receive AP vicinity information decode and decompress the AP vicinity information. The mobile device may then determine its location using information corresponding to a received signal (e.g., signal strength, timing, or the like), and the AP vicinity information.

Figure 9:
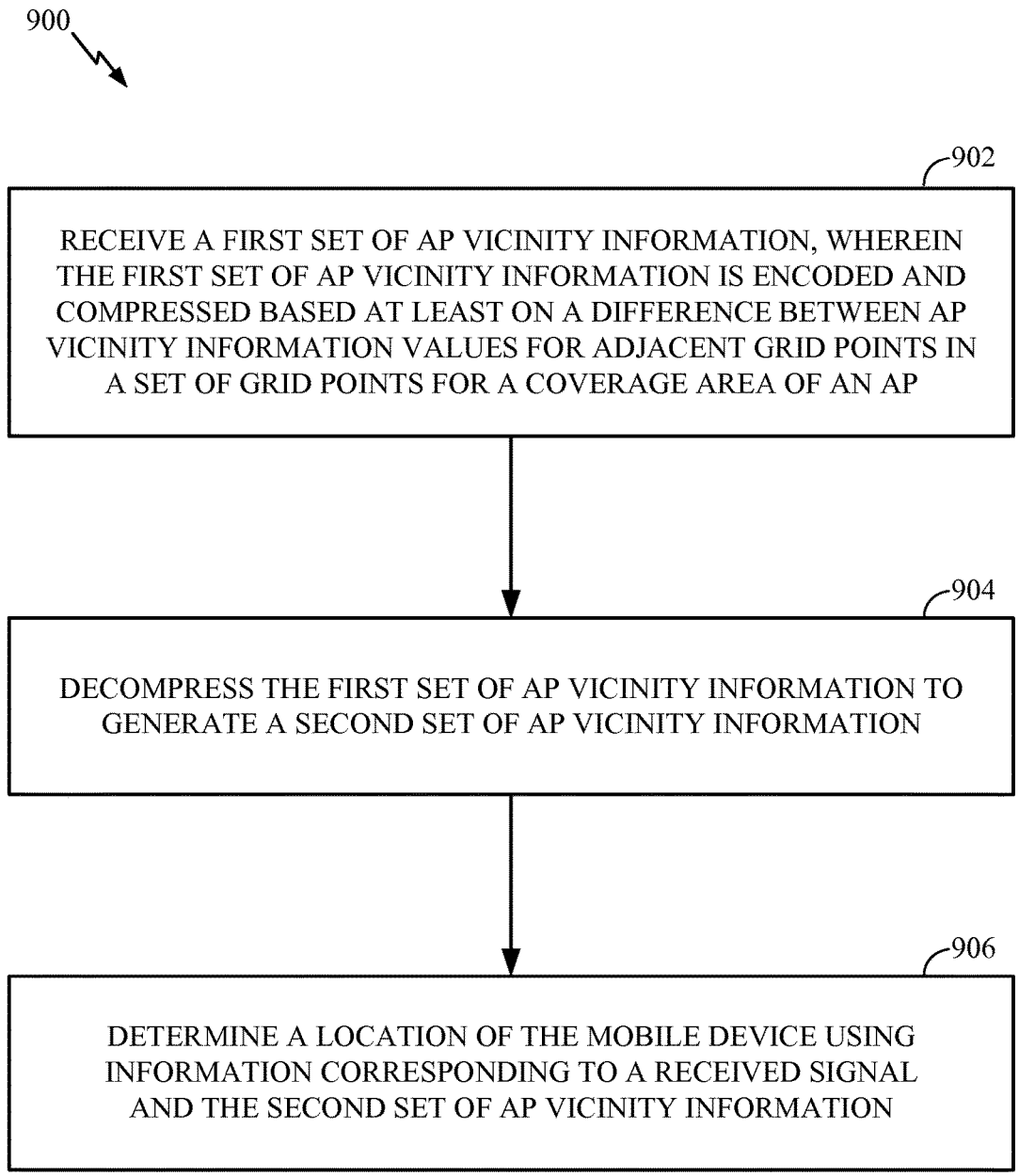
FIG. 9 illustrates example operations that may be performed by a mobile device to utilize vicinity information, in accordance with certain embodiments of the present disclosure.

FIG. 9 illustrates example operations of that may be performed by a mobile device to utilize access point vicinity information, in accordance with certain embodiments of the present disclosure. At 902, the mobile device receives a first set of AP vicinity information. The first set of AP vicinity information may be encoded and compressed based at least on a difference between AP vicinity information values for adjacent grid points in a set of grid points for a coverage area of an AP. At 904, the mobile device decompresses the first set of AP vicinity information to generate a second set of AP vicinity information. At 906, the mobile device determines its location using information corresponding to a received signal and the second set of AP vicinity information.

Figure 10:
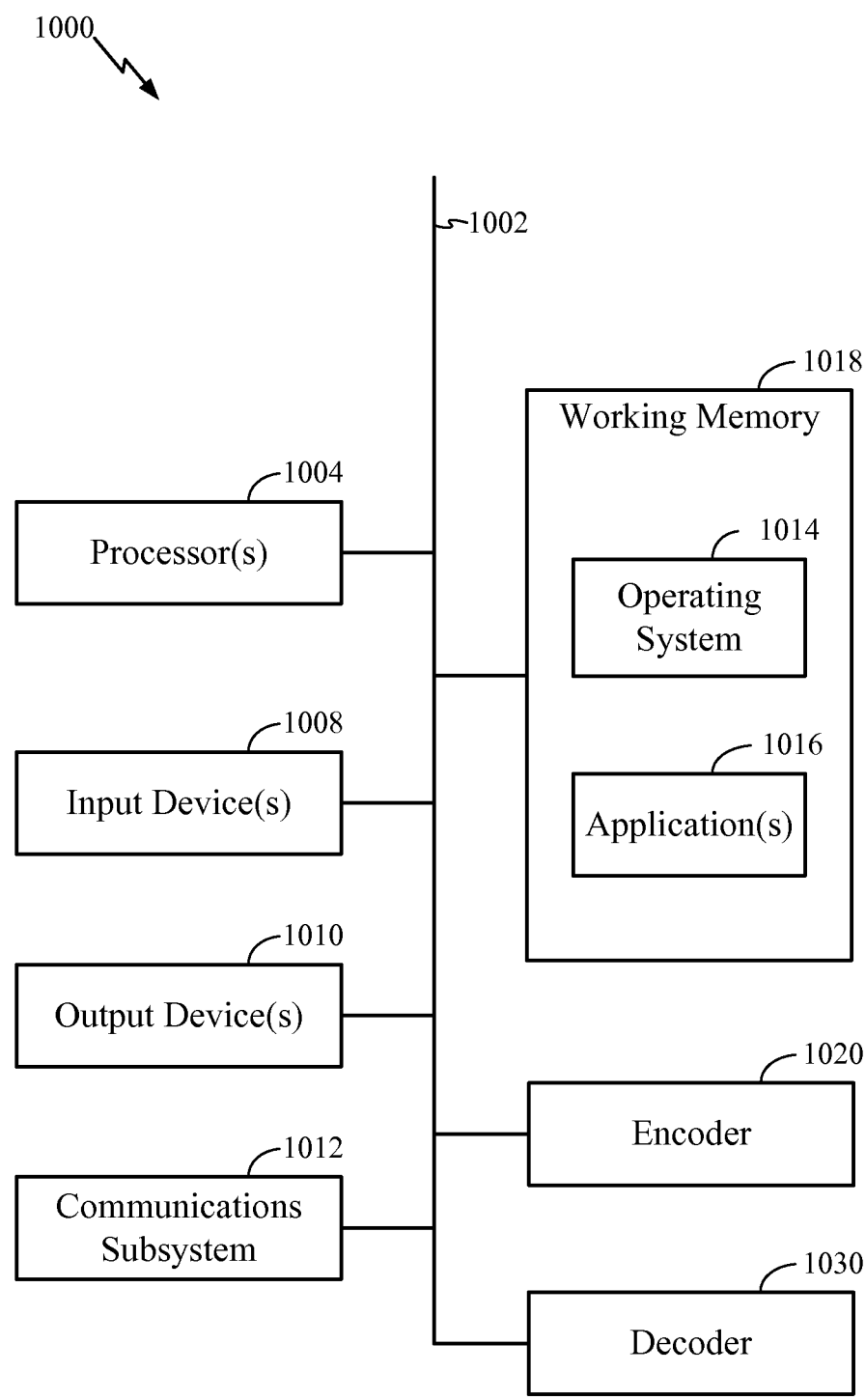
FIG. 10 describes one potential implementation of a device which may be used to provide and/or utilize vicinity information, according to certain embodiments.

FIG. 10 describes one potential implementation of a device which may be used to provide or receive AP vicinity information, according to certain embodiments. The device may be a mobile device such as UE1 108 in FIG. 1 or a location server such as location sever 110 in FIG. 1. In one embodiment, the device may be mobile device 108 as described in FIG. 1 which may be implemented with the specifically described details of process 900. In the embodiment of device 1000 shown in FIG. 10, specialized modules such as encoder 1020 may perform any type of encoding based on delta encoding, double delta encoding, JPEG or the like. Device 1000 may also or instead perform decoding of AP vicinity information using a decoder 1030—e.g., if device 1000 is a mobile device. These modules may be implemented to interact with various other modules of device 1000. Memory 1020 may be configured to store data regarding heat maps, and may also store settings and instructions regarding grid orientation, spacing, etc. In one embodiment, device 1000 may employ both encoding and decoding. For example, device 1000 may receive a compressed heat map based on a first compression method from another entity and perform decoding and decompression to obtain original signal values (e.g., mean RSSI, mean RTT) for a set of grid points in a bounding box overlaying the coverage area of an AP. The first compression method may correspond to one of the methods described herein—e.g., delta compression or double delta compression. The device 1000 may then compress and encode the original signal values using a second encoding and compression method different to the first method—e.g., using double delta compression if the first method used single delta compression. The newly compressed values may then be sent to one or more mobile devices. The method may be used, for example, at a location server (e.g., location server 110 in FIG. 1) in order to provide heat maps to mobile devices—e.g., if the second compression method is more efficient than the first method or if mobile devices support the second compression method but not the first compression method.

In the embodiment shown at FIG. 10, the device may be a mobile device or a location server and include processor 1004 configured to execute instructions for performing operations at a number of components and can be, for example, a general-purpose processor or microprocessor suitable for implementation within a portable electronic device. Processor 1004 may thus implement any or all of the specific steps for operating compression module as described herein. Processor 1004 is communicatively coupled with a plurality of components within mobile device 1000. To realize this communicative coupling, processor 1004 may communicate with the other illustrated components across a bus 1002. Bus 1002 can be any subsystem adapted to transfer data within mobile device 1000. Bus 1002 can be a plurality of computer buses and include additional circuitry to transfer data.

Memory 1018 may be coupled to processor 1004. In some embodiments, memory 1018 offers both short-term and long-term storage and may in fact be divided into several units. Short term memory may store data which may be discarded after an analysis, or all data may be stored in long term storage depending on user selections. Memory 1018 may be volatile, such as static random access memory (SRAM) and/or dynamic random access memory (DRAM) and/or non-volatile, such as read-only memory (ROM), flash memory, and the like. Furthermore, memory 1018 can include removable storage devices, such as secure digital (SD) cards. Thus, memory 1018 provides storage of computer readable instructions, data structures, program modules, and other data for mobile device 1000. In some embodiments, memory 1018 may be distributed into different hardware modules.

In some embodiments, memory 1018 stores software code for a plurality of applications 1016. Applications 1016 contain particular instructions to be executed by processor 1004. In alternative embodiments, other hardware modules may additionally execute certain applications or parts of applications. Memory 1018 may be used to store computer readable instructions for modules that implement scanning according to certain embodiments, and may also store compact object representations as part of a database.

In some embodiments, memory 1018 includes an operating system 1014. Operating system 1014 may be operable to initiate the execution of the instructions provided by application modules and/or manage other hardware modules as well as interfaces with communication modules which may use wireless transceiver 1012 and a link 1018. Operating system 1014 may be adapted to perform other operations across the components of mobile device 1000, including threading, resource management, data storage control and other similar functionality.

In some embodiments, device 1000 includes a plurality of other hardware modules (e.g., encoder 1020, decoder 1030). Each of the other hardware modules is a physical module within device 1000. However, while each of the hardware modules is permanently configured as a structure, a respective one of hardware modules may be temporarily configured to perform specific functions or temporarily activated.

Other embodiments may include sensors integrated into device 1000. An example of a sensor can be, for example, an accelerometer, a wi-fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensors may be implemented as hardware, software, or firmware. Further, as described herein, certain hardware modules such as the accelerometer, the GPS module, the gyroscope, the inertial sensor, or other such modules may be used in conjunction with the camera and image processing module to provide additional information. In certain embodiments, a user may use a user input module 1008 to select how to analyze the heat maps.

Device 1000 may include a component such as a communication module 1012 which may enable device 1000 to communicate with other entities (e.g., APs such as APs 102, 104 and 106 in FIG. 1 or other entities in a network such as entities in wireless network 120 in FIG. 1) via wireless or wire line means. Communications module 1012 may support wireless communication (e.g., if device 1000 is a mobile device) and may then integrate an antenna and wireless transceiver with any other hardware, firmware, or software necessary for wireless communications. Such a wireless communication module may be configured to receive signals from various devices such as data sources via networks and access points such as a network access point.

In addition to other hardware modules and applications in memory 1018, device 1000 may have a display output 1010 and a user input module 1008. Display output 1010 graphically presents information from device 1000—e.g., to the user in the case that device 1000 is a mobile device. This information may be derived from one or more application modules, one or more hardware modules, a combination thereof, or any other suitable means for resolving graphical content for the user (e.g., by operating system 1014). Display output 1010 can be liquid crystal display (LCD) technology, light emitting polymer display (LPD) technology, or some other display technology. In some embodiments, display module 1010 is a capacitive or resistive touch screen and may be sensitive to haptic and/or tactile contact with a user. In such embodiments, the display output 1010 can comprise a multi-touch-sensitive display. Display output 1010 may then be used to display any number of outputs associated with a camera or image processing module such as alerts, settings, thresholds, user interfaces, or other such controls.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method for utilizing access point (AP) vicinity information, the method comprising:
receiving, by a mobile device, a first set of encoded and compressed AP vicinity information from a device,
wherein the first set of encoded and compressed AP vicinity information comprises a double delta value, the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompressing the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determining a location of the mobile device using information corresponding to a received wireless signal and the second set of AP vicinity information; and
wherein the first set of encoded and compressed AP vicinity information corresponds to a difference between received signal strength values at adjacent grid points in the set of grid points.

2. The method of claim 1, wherein decompressing the first set of encoded and compressed AP vicinity information comprises:
determining AP vicinity information values corresponding to each of the grid points in the set of grid points based on the delta values and a vicinity information value corresponding to a predefined grid point.

3. A method for utilizing access point (AP) vicinity information, the method comprising:
receiving, by a mobile device, a first set of encoded and compressed AP vicinity information from a device,
wherein the first set of encoded and compressed AP vicinity information comprises a double delta value, the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompressing the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determining a location of the mobile device using information corresponding to a received wireless signal and the second set of AP vicinity information; and
wherein the first set of encoded and compressed AP vicinity information corresponds to a difference between round trip time for signal propagation between the AP and each of the adjacent grid points in the set of grid points.

4. A mobile device for utilizing access point (AP) vicinity information, the mobile device comprising:
a memory that stores machine-readable instructions; and
at least one processor coupled to the memory,
wherein the instructions, when executed by the at least one processor, cause the at least one processor to:
receive a first set of encoded and compressed AP vicinity information from a device,
wherein the first set of encoded and compressed AP vicinity information comprises a double delta value, the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determine a location of the mobile device using information corresponding to a received signal and the second set of AP vicinity information; and
wherein the first set of encoded and compressed AP vicinity information corresponds to a difference between received signal strength values at adjacent grid points in the set of grid points.

5. A mobile device for utilizing access point (AP) vicinity information, the mobile device comprising:
a memory that stores machine-readable instructions; and
at least one processor coupled to the memory,
wherein the instructions, when executed by the at least one processor, cause the at least one processor to:

receive a first set of encoded and compressed AP vicinity information from a device,
wherein the first set of encoded and compressed AP vicinity information comprises a double delta value,
the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determine a location of the mobile device using information corresponding to a received signal and the second set of AP vicinity information; and
wherein the first set of encoded and compressed AP vicinity information corresponds to a difference between round trip time for signal propagation between the AP and each of the adjacent grid points in the set of grid points.

6. A non-transitory processor-readable medium comprising processor-readable instructions, the instructions, when executed by a processor, the instructions, when executed by a processor, cause the processor to:
receive, by a mobile device, a first set of encoded and compressed access point (AP) vicinity information from a device,
wherein the first set of encoded and compressed AP vicinity information comprises a double delta value,
the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value; and
determine a location of the mobile device using information corresponding to a received signal and the second set of AP vicinity information; and
wherein the first set of encoded and compressed AP vicinity information corresponds to a difference between received signal strength values at adjacent grid points in the set of grid points.

7. A non-transitory processor-readable medium comprising processor-readable instructions, the instructions, when executed by a processor, the instructions, when executed by a processor, cause the processor to:
receive, by a mobile device, a first set of encoded and compressed access point (AP) vicinity information from a device,
wherein the first set of encoded and compressed AP vicinity information comprises a double delta value,
the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value; and
determine a location of the mobile device using information corresponding to a received signal and the second set of AP vicinity information; and
wherein the first set of encoded and compressed AP vicinity information corresponds to a difference between round trip time for signal propagation between the AP and each of the adjacent grid points in the set of grid points.

8. An apparatus for utilizing access point (AP) vicinity information, the apparatus comprising:
means for receiving a first set of encoded and compressed AP vicinity information from a device,
wherein the first set of encoded and compressed AP vicinity information comprises a double delta value,
the double delta value based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points, the AP vicinity information values comprising values corresponding to wireless signals associated with the AP;
means for decompressing the first set of encoded and compressed AP vicinity information to generate a second set of AP vicinity information comprising a plurality of delta values corresponding to adjacent grid points of the set of grid points, the plurality of delta values comprising the first single delta value and the second single delta value;
means for determining a location of the apparatus using information corresponding to a received signal and the second set of AP vicinity information; and
wherein the first set of encoded and compressed AP vicinity information corresponds to a difference between received signal strength values at adjacent grid points in the set of grid points.

9. An apparatus for utilizing access point (AP) vicinity information, the apparatus comprising:
means for receiving a first set of encoded and compressed AP vicinity information from a device,
wherein the first set of encoded and compressed AP vicinity information comprises a double delta value, the double delta value based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
means for decompressing the first set of encoded and compressed AP vicinity information to generate a second set of AP vicinity information comprising a plurality of delta values corresponding to adjacent grid points of the set of grid points, the plurality of delta values comprising the first single delta value and the second single delta value;
means for determining a location of the apparatus using information corresponding to a received signal and the second set of AP vicinity information; and
wherein the first set of encoded and compressed AP vicinity information corresponds to a difference between round trip time for signal propagation between the AP and each of the adjacent grid points in the set of grid points.

10. A method for utilizing access point (AP) vicinity information, the method comprising:
receiving, by a mobile device, a first set of encoded and compressed AP vicinity information from a device,
wherein the first set of encoded and compressed AP vicinity information comprises a double delta value, the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompressing the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determining a location of the mobile device using information corresponding to a received wireless signal and the second set of AP vicinity information; and
wherein the predetermined range of values comprises a first predetermined range of values, and wherein the first set of encoded and compressed AP vicinity information further comprises an indication of one of a predetermined range of values from among two or more predetermined ranges of values.

11. The method of claim 10, wherein the two or more predetermined ranges of values comprise a low-range, a mid-range and a high-range.

12. A mobile device for utilizing access point (AP) vicinity information, the mobile device comprising:
a memory that stores machine-readable instructions; and
at least one processor coupled to the memory,
wherein the instructions, when executed by the at least one processor, cause the at least one processor to:
receive a first set of encoded and compressed AP vicinity information from a device,
wherein the first set of encoded and compressed AP vicinity information comprises a double delta value, the double delta value determined based on a mapping of a difference between a first single delta value and a second single delta value to a predetermined range of values,
the first single delta value indicating a difference between AP vicinity information values for a first pair of adjacent grid points in a set of grid points, and
the second single delta value indicating a difference between AP vicinity information values for a second pair of adjacent grid points different from the first pair, the second pair of adjacent grid points in the set of grid points,
the AP vicinity information values comprising values corresponding to wireless signals associated with the AP;
decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value;
determine a location of the mobile device using information corresponding to a received signal and the second set of AP vicinity information;

wherein the predetermined range of values comprises a first predetermined range of values, and wherein the first set of encoded and compressed AP vicinity information further comprises an indication of one of a predetermined range of values from among two or more predetermined ranges of values; and wherein the two or more predetermined ranges of values comprise a low-range, a mid-range and a high-range.

13. A non-transitory processor-readable medium comprising processor-readable instructions, the instructions, when executed by a processor, the instructions, when executed by a processor, cause the processor to:

receive, by a mobile device, a first set of encoded and compressed access point (AP) vicinity information from a device, wherein the first set of encoded and compressed AP vicinity information comprises a double delta value, the double delta value determined based on a mapping of a difference between a first single delta value and a second single delta value to a predetermined range of values, the first single delta value indicating a difference between AP vicinity information values for a first pair of adjacent grid points in a set of grid points, and the second single delta value indicating a difference between AP vicinity information values for a second pair of adjacent grid points different from the first pair, the second pair of adjacent grid points in the set of grid points, the AP vicinity information values comprising values corresponding to wireless signals associated with the AP;

decompress the first set of encoded and compressed AP vicinity information to generate a second set of AP vicinity information comprising a plurality of delta values corresponding to adjacent grid points of the set of grid points, the plurality of delta values comprising the first single delta value and the second single delta value;

determine a location of the mobile device using information corresponding to a received signal and the second set of AP vicinity information;

wherein the predetermined range of values comprises a first predetermined range of values, and wherein the first set of encoded and compressed AP vicinity information further comprises an indication of one of a predetermined range of values from among two or more predetermined ranges of values; and wherein the two or more predetermined ranges of values comprise a low-range, a mid-range and a high-range.

* * * * *